UNITED STATES PATENT OFFICE.

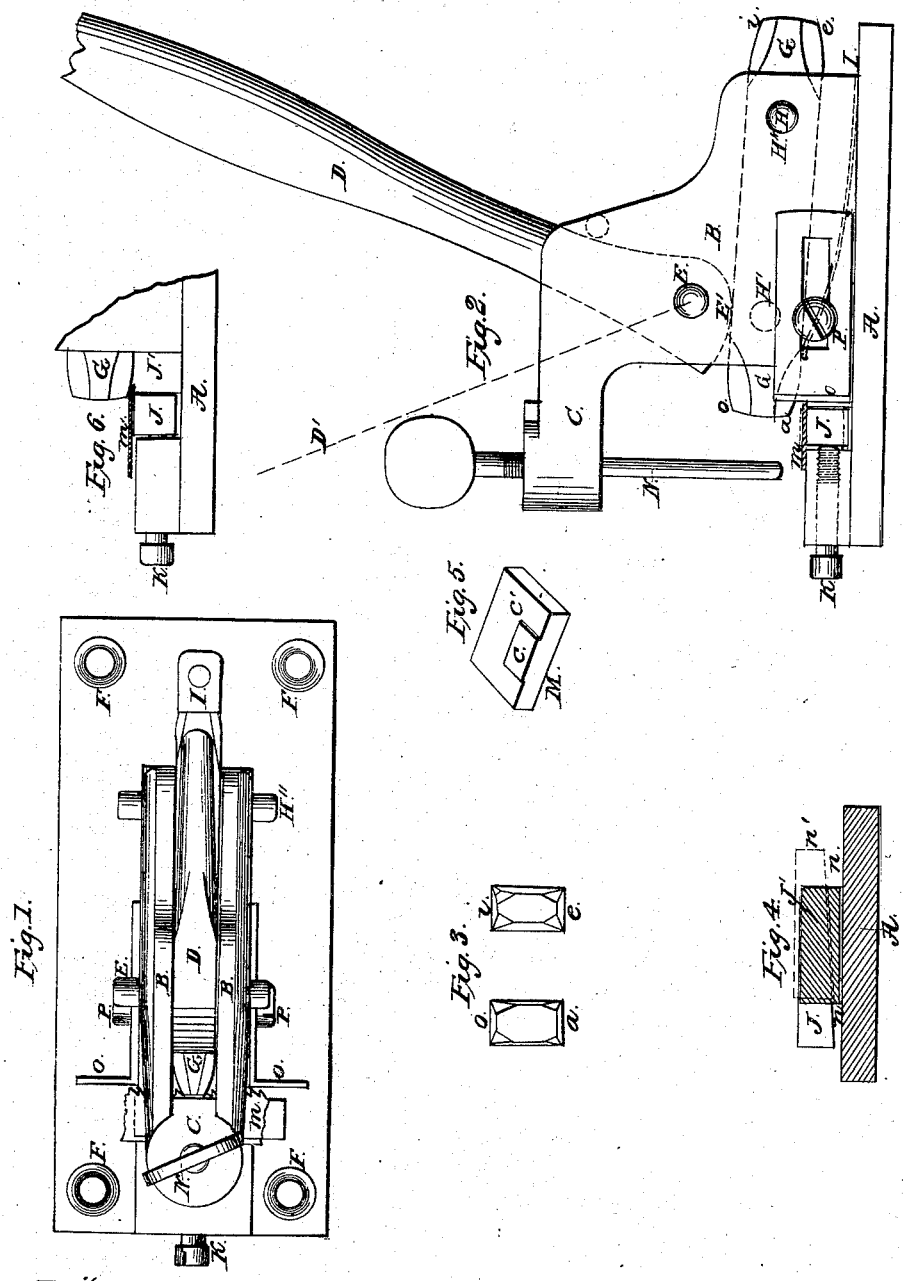

JOHN MADDEN, OF YOUNGSTOWN, OHIO.

IMPROVEMENT IN SAW-SETS.

Specification forming part of Letters Patent No. 37,297, dated January 6, 1863.

*To all whom it may concern:*

Be it known that I, JOHN MADDEN, of Youngstown, in the county of Mahoning and State of Ohio, have invented new and useful Improvements in Saw-Sets; and I do hereby declare that the following is a full and complete description of the construction and operation of the same, reference being had to the accompanying drawings, making part of this specification, in which—

Figure 1 is a top view. Fig. 2 is a side view; and Figs. 3 to 7, inclusive, are sectional parts.

The nature of my invention relates to such a construction of the instrument that the whole tooth is set in such a manner that the saw will cut the same width during the life of the tooth—that is to say, every alternate tooth upon each side of the saw is bent at a sharp angle at its base, as seen in Fig. 7, leaving the outer sides or face of each tooth parallel with the body of the saw, as shown at $x\,x$ in Fig. 7.

In the ordinary method of setting saws by means of a punch and hammer, or by the use of instruments hitherto constructed, the teeth are simply bent at their base to a greater or less angle, like the letter Y, consequently at every filing of the saw the cut becomes narrower, and before the teeth are half worn away a new set is needed. By my improved method the whole tooth is set at its base, as seen in Fig. 7, so that as long as any portion of the tooth remains the cut of the saw remains the same.

The advantages of this improvement will at first sight become apparent to every one accustomed to the use of the saw.

The body of my improved instrument is made of cast-iron; and it consists of the bed-plate A and the upright B and neck C, all cast in one piece. The upright B is divided longitudinally in the center to receive the cam-lever D. This cam-lever works upon a strong pin, E, passing through both branches of the upright B, and forms its fulcrum, and when the cam-lever is not under pressure, it rests in the position seen in Fig. 2. In making its stroke it is brought forward to the dotted line D' in Fig. 2. The base-piece A is broader than the upright B, and is provided with screw-holes F, for the purpose of securing it to the bench.

G represents punch or male die. This is made of steel and tempered at the ends. There are four different faces on this male die G, (shown at $a\,e\,i\,o$ in Figs. 1 and 3,) designed for different thicknesses of saw-plate and different size of teeth. The die G is pierced near each end with holes H H', and is secured by either, as at H'', by a strong pin passing through both wings of the upright B, as seen in Figs. 1 and 2. The die G can therefore be changed to either one of the four positions it is fitted to occupy, simply by removing and replacing the pin H''. There is a spring, I, placed beneath the die G, of sufficient strength to keep the die in contact with the cam E' of the cam-lever D.

J J' in Figs. 1, 4, and 6 represent the lower or female dies. These are in parts, as in Figs. 2, 4, and 6, or in one piece, as in Fig. 5.

In Figs. 2, 4, and 6 the dies are represented as being adjustable. The die J is in the form of a wedge, as seen in Fig. 4, and it rests upon an inclined plane, $n\,n$, Fig. 4, of the same inclination as the die, so that the upper surface of the die J is constantly horizontal. This die is held in any desired position by the set-screw K. When the die J is set, as in Fig. 4, the upper surface of J and J' will be in the same plane, but when the die J is shoved in, as indicated by the dotted line $n'$, the surface of J is higher than J', and the saw-tooth will receive just that amount of set, when acted upon by the die G, as seen in Fig. 6, the saw-plate being represented by $m$.

The die M, Fig. 5, has upon its face a permanent elevation, $c$, upon which the saw-plate rests, and the tooth is set down upon the lower face, $c'$. The thickness, therefore, of the permanent elevation $c$ determines the amount of set given to the saw. When the die M is introduced, the dies J J' are removed, and M inserted in their places and secured by the set-screw K. The saw-plate is held in contact with the lower die by the thumb-screw N, which passes through the neck $c$, as seen in Fig. 2. Upon each side of the dies is fixed a gage, O, (brass or copper is preferred,) against which the points of the saw-teeth rest, when the saw is being set. These gages can be moved backward or forward, according to the length of the teeth, as seen in Fig. 1, $m$ representing the saw-plate. The gages are secured in place by the screws P. The die G is adjustable to four different positions by turning it over and changing ends, as before intimated. Either circular or straight saws of any size or thickness of plate can be set on a suitable-sized instrument of this construction.

What I claim as my improvement, and desire to secure by Letters Patent, is—

1. The male die G, in combination the female dies J; J', and M, when constructed and operating substantially as and for the purpose set forth.

2. The peculiar form or shape of the teeth, as shown in Fig. 7.

JOHN MADDEN.

Witnesses:
W. H. BURRIDGE,
A. W. McCLELLAND.